United States Patent
Akhtar et al.

(10) Patent No.: US 10,830,214 B2
(45) Date of Patent: Nov. 10, 2020

(54) METHOD FOR SECURING A LIGHTNING RECEPTOR CABLE WITHIN A SEGMENTED ROTOR BLADE

(71) Applicant: General Electric Company, Schenectady, NY (US)

(72) Inventors: Afroz Akhtar, Bangalore (IN); Revathy Murugappan, Bangalore (IN); Ramananda Prabhu, Bangalore (IN)

(73) Assignee: General Electric Company, Schenectady, NY (US)

( * ) Notice: Subject to any disclaimer, the term of this patent is extended or adjusted under 35 U.S.C. 154(b) by 669 days.

(21) Appl. No.: 15/466,109

(22) Filed: Mar. 22, 2017

(65) Prior Publication Data
US 2018/0274521 A1 Sep. 27, 2018

(51) Int. Cl.
*F03D 80/30* (2016.01)
*F03D 1/06* (2006.01)

(52) U.S. Cl.
CPC ............ *F03D 80/30* (2016.05); *F03D 1/0675* (2013.01); *F05B 2230/60* (2013.01); *F05B 2240/221* (2013.01); *Y02E 10/721* (2013.01); *Y02E 10/722* (2013.01); *Y02E 10/728* (2013.01); *Y02P 70/523* (2015.11)

(58) Field of Classification Search
CPC .... F03D 80/30; F03D 1/0675; F05B 2230/60; F05B 2230/604; F05B 2240/221; Y02P 70/523; Y02E 10/728; Y02E 10/721; Y02E 10/722
See application file for complete search history.

(56) References Cited

U.S. PATENT DOCUMENTS

| | | | |
|---|---|---|---|
| 2,173,717 A | 9/1939 | Hobart | |
| 4,944,655 A * | 7/1990 | Merz | B64C 11/26 416/146 R |
| 6,612,810 B1 * | 9/2003 | Olsen | F03D 80/30 416/95 |
| 6,979,179 B2 * | 12/2005 | Møller Larsen | F03D 80/30 415/4.3 |

(Continued)

FOREIGN PATENT DOCUMENTS

CN 201810500 U 4/2011

OTHER PUBLICATIONS

U.S. Appl. No. 14/574,532, filed Dec. 18, 2014.

*Primary Examiner* — David E Sosnowski
*Assistant Examiner* — Wayne A Lambert
(74) *Attorney, Agent, or Firm* — Dority & Manning, P.A.

(57) ABSTRACT

The present subject matter is directed to a rotor blade assembly having a rotor blade with a blade tip segment having a blade tip and a blade root segment having a blade root. The blade segments extend in opposite directions from a chord-wise joint. The blade tip segment includes a beam structure extending lengthways that structurally connects with the blade root segment via a receiving section. The assembly also includes a plurality of first bolt joints located at a first end of the beam structure for connecting with the receiving section of the blade root segment. The assembly also includes a lightning protection system with at least one lightning receptor coupled to a lightning receptor cable. The lightning receptor cable is routed from the blade tip to each of the plurality of first bolt joints and to the blade root.

8 Claims, 9 Drawing Sheets

(56) References Cited

U.S. PATENT DOCUMENTS

| | | | | |
|---|---|---|---|---|
| 7,186,086 | B2* | 3/2007 | Yoshida | F03D 1/0633 416/146 R |
| 7,508,186 | B2* | 3/2009 | Mortensen | H02G 13/80 324/72 |
| 7,726,942 | B2* | 6/2010 | Mortensen | G01M 11/086 416/5 |
| 7,729,100 | B2* | 6/2010 | Llorente Gonzalez | B82Y 30/00 244/1 A |
| 7,922,454 | B1* | 4/2011 | Riddell | F03D 1/0675 416/224 |
| 8,133,031 | B2* | 3/2012 | Arinaga | H02G 13/00 29/889.71 |
| 8,562,296 | B2* | 10/2013 | Arocena De La Rua | F03D 80/30 415/4.3 |
| 8,622,710 | B2 | 1/2014 | Rindt et al. | |
| 8,727,723 | B2* | 5/2014 | Flemming | H02G 13/00 416/1 |
| 8,734,110 | B2 | 5/2014 | Kuroiwa et al. | |
| 8,888,454 | B2* | 11/2014 | Hansen | F03D 1/0675 416/39 |
| 9,702,338 | B2* | 7/2017 | Richers | B29C 70/42 |
| 2007/0018049 | A1* | 1/2007 | Stuhr | B64C 23/069 244/124 |
| 2011/0052403 | A1* | 3/2011 | Kawasetsu | F03D 1/0675 416/226 |
| 2011/0081248 | A1* | 4/2011 | Hibbard | F03D 1/0675 416/226 |
| 2011/0243737 | A1 | 10/2011 | Bell et al. | |
| 2012/0003094 | A1* | 1/2012 | Hansen | F03D 1/0675 416/146 R |
| 2014/0301857 | A1* | 10/2014 | Richers | B29C 70/42 416/230 |
| 2015/0098823 | A1* | 4/2015 | Iriarte Eleta | F03D 80/40 416/146 R |
| 2015/0369211 | A1 | 12/2015 | Merzhaeuser | |
| 2016/0131110 | A1* | 5/2016 | Livingston | F03D 80/30 416/146 R |
| 2016/0177926 | A1 | 6/2016 | Akhtar et al. | |
| 2016/0222945 | A1* | 8/2016 | Shiraishi | F03D 80/30 |
| 2016/0258423 | A1* | 9/2016 | Whitehouse | F03D 80/30 |

* cited by examiner

METHOD FOR SECURING A LIGHTNING RECEPTOR CABLE WITHIN A SEGMENTED ROTOR BLADE

FIELD OF THE INVENTION

The present subject matter relates generally to wind turbines and, more particularly, to methods for securing a lightning receptor cable within a segmented rotor blade of a wind turbine.

BACKGROUND OF THE INVENTION

Wind power is considered one of the cleanest, most environmentally friendly energy sources presently available, and wind turbines have gained increased attention in this regard. A modern wind turbine typically includes a tower, a generator, a gearbox, a nacelle, and one or more rotor blades. The rotor blades capture kinetic energy from wind using known foil principles and transmit the kinetic energy through rotational energy to turn a shaft coupling the rotor blades to a gearbox, or if a gearbox is not used, directly to the generator. The generator then converts the mechanical energy to electrical energy that may be deployed to a utility grid.

Some modern wind turbine rotor blades include a segmented design having a plurality of rotor blade segments joined together at one or more joint locations. For example, U.S. Publication No.: 2015/0369211 entitled "Wind Turbine Tip Joint" filed on Jun. 19, 2014, which is incorporated herein by reference in its entirety, describes a segmented rotor blade having a first blade segment with a beam structure that structurally connects with a second blade segment at a receiving section. During assembly of such rotor blades, the beam structure is placed within the receiving section and secured together via at least one chord-wise-extending metal pin and at least one span-wise-extending metal pin. As with any metal components, however, the metal pins can be prone to lightning strikes.

Thus, as is generally known, wind turbines typically include a lightning protection system having one or more lightning receptors disposed on the exterior of or within the rotor blades and a lighting receptor cable or wire coupled to the lightning receptor(s) and extending through the rotor blades down through the tower to a ground location. Thus, when lightning strikes the rotor blade, the electrical current may flow through the lightning receptor(s) and may be conducted through the lightning receptor cable to the ground.

In order to protect the segmented rotor blades described herein from lightning strikes to the metal components within the joint, such components need to be grounded properly. In addition, due to the multiple segments of the rotor blade, the down conductor needs to be connected through the segments once the rotor blade is assembled.

Accordingly, there is a need for improved systems and methods for securing the down conductor of the lightning protection system within a segmented rotor blade of a wind turbine.

BRIEF DESCRIPTION OF THE INVENTION

Aspects and advantages of the invention will be set forth in part in the following description, or may be obvious from the description, or may be learned through practice of the invention.

In one aspect, the present disclosure is directed to a rotor blade assembly for a wind turbine. The rotor blade assembly includes a rotor blade having a blade tip segment and a blade root segment. Further, the blade tip segment includes a blade tip of the rotor blade, whereas the blade root segment includes a blade root of the rotor blade. In addition, the blade tip segment and the blade root segment extend in opposite directions from a chord-wise joint. Moreover, both the blade tip segment and the blade root segments have an internal support structure. More specifically, the blade tip segment includes a beam structure extending lengthways that structurally connects with the blade root segment via a receiving section, wherein the beam structure forms a portion of the internal support structure and includes a shear web connected with a suction side spar cap and a pressure side spar cap. The rotor blade assembly also includes a plurality of first bolt joints located at a first end of the beam structure for connecting with the receiving section of the blade root segment. Further, the rotor blade assembly includes a lightning protection system configured with the rotor blade having at least one lightning receptor and at least one lightning receptor cable electrically coupled together to form a conductive circuit. Moreover, the lightning receptor cable is routed from the blade tip to each of the plurality of first bolt joints and to the blade root.

In one embodiment, the plurality of first bolt joints may include, at least, a span-wise bushing connection extending from an end face of the beam structure and a first chord-wise bushing connection extending through the beam structure. As such, the span-wise bushing connection fits within the receiving section of the blade root segment and the first chord-wise bushing connection fits within corresponding slots of the receiving section that align with a chord-wise slot of the beam structure. In another embodiment, the first chord-wise bushing connection may extend beyond the beam structure so as to form one or more attachment locations for the lightning receptor cable.

In further embodiments, the receiving section of the blade root segment may include a plurality of spar structures extending lengthways for connecting with the beam structure of the blade tip segment using one of the first bolt joints in the chord-wise direction.

In such embodiments, the first bolt joints may also include at least one second chord-wise bushing connection configured to connect the spar structures at an end thereof. In certain embodiments, the second chord-wise bushing connection may extend beyond the connected spar structures so as to form one or more attachment locations for the lightning receptor cable.

In particular embodiments, the rotor blade assembly may include a plurality of bracket members. More specifically, one of the bracket members may be secured to one or more of the attachment locations defined by the bushing connections. As such, the lightning receptor cable can be secured to each of the bracket members. More specifically, each of the bracket members may include one or more threaded holes configured to receive the lightning receptor cable.

In certain embodiments, the rotor blade assembly may also include a plurality of second bolt joints located at the chord-wise joint. In such embodiments, the first bolt joints located at the first end of beam structure may be separated span-wise with the plurality of second bolt joints located at the chord-wise joint.

In another aspect, the present disclosure is directed to method of assembling a rotor blade of a wind turbine. The method includes arranging a blade tip segment having a blade tip and a blade root segment having a blade root in opposite directions from a chord-wise joint. The method also includes inserting a beam structure extending lengthways from the blade tip segment into a receiving section of the blade root segment. Further, the method includes routing a lightning receptor cable from the blade tip through a plurality of first bolt joints located at a first end of the beam structure. In addition, the method includes securing the first end of the beam structure within the receiving section via the plurality of first bolt joints. Moreover, the method includes routing the lightning receptor cable from the plurality of first blade joints to the blade root.

In one embodiment, the method may also include securing the lightning receptor cable to the internal support structure, such as the shear web and/or the spar caps of the rotor blade.

As mentioned, in certain embodiments, the first bolt joints may include at least a span-wise bushing connection extending from an end face of the beam structure and a first chord-wise bushing connection extending through the beam structure. As such, the span-wise bushing connection fits within the receiving section of the blade root segment and the first chord-wise bushing connection fits within corresponding slots of the receiving section that align with a chord-wise slot of the beam structure.

In certain embodiments, the receiving section of the blade root segment may include a plurality of spar structures extending lengthways for connecting with the beam structure of the blade tip segment using one of the first bolt joints in the chord-wise direction. As such, in one embodiment, the method may include routing the lightning receptor cable along an inner surface of one of the spar structures. In alternative embodiments, the method may include routing the lightning receptor cable along an outer surface of one of the spar structures.

In another embodiment, the method may include securing the spar structures together at an end thereof via at least one second chord-wise bushing connection.

In further embodiments, the second chord-wise bushing connection may extend beyond the connected spar structures so as to form one or more attachment locations for the lightning receptor cable. As such, the method may also include securing a plurality of bracket members to one of the attachment locations of each of the plurality of first bolt joints and securing the lightning receptor cable to each of the bracket members.

In additional embodiments, the step of securing the lightning receptor cable to each of the bracket members may include routing the lightning receptor cable through one or more threaded holes of each of the bracket members.

It should be understood that the method may also include any of the additional steps and/or feature as described herein.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Generally, the present disclosure is directed to improved systems and method for securing a lightning receptor cable within a segmented rotor blade of a wind turbine. The method includes arranging a blade tip segment having a blade tip and a blade root segment having a blade root in opposite directions from a chord-wise joint. The method also includes inserting a beam structure extending lengthways from the blade tip segment into a receiving section of the blade root segment. Further, the method includes routing the lightning receptor cable from a blade tip of the blade segment through a plurality of first bolt joints located at a first end of the beam structure. In addition, the method includes securing an end of the beam structure within the receiving section via the plurality of first bolt joints. Moreover, the method includes routing the lightning receptor cable from the plurality of first blade joints to the blade root.

Figure 1:
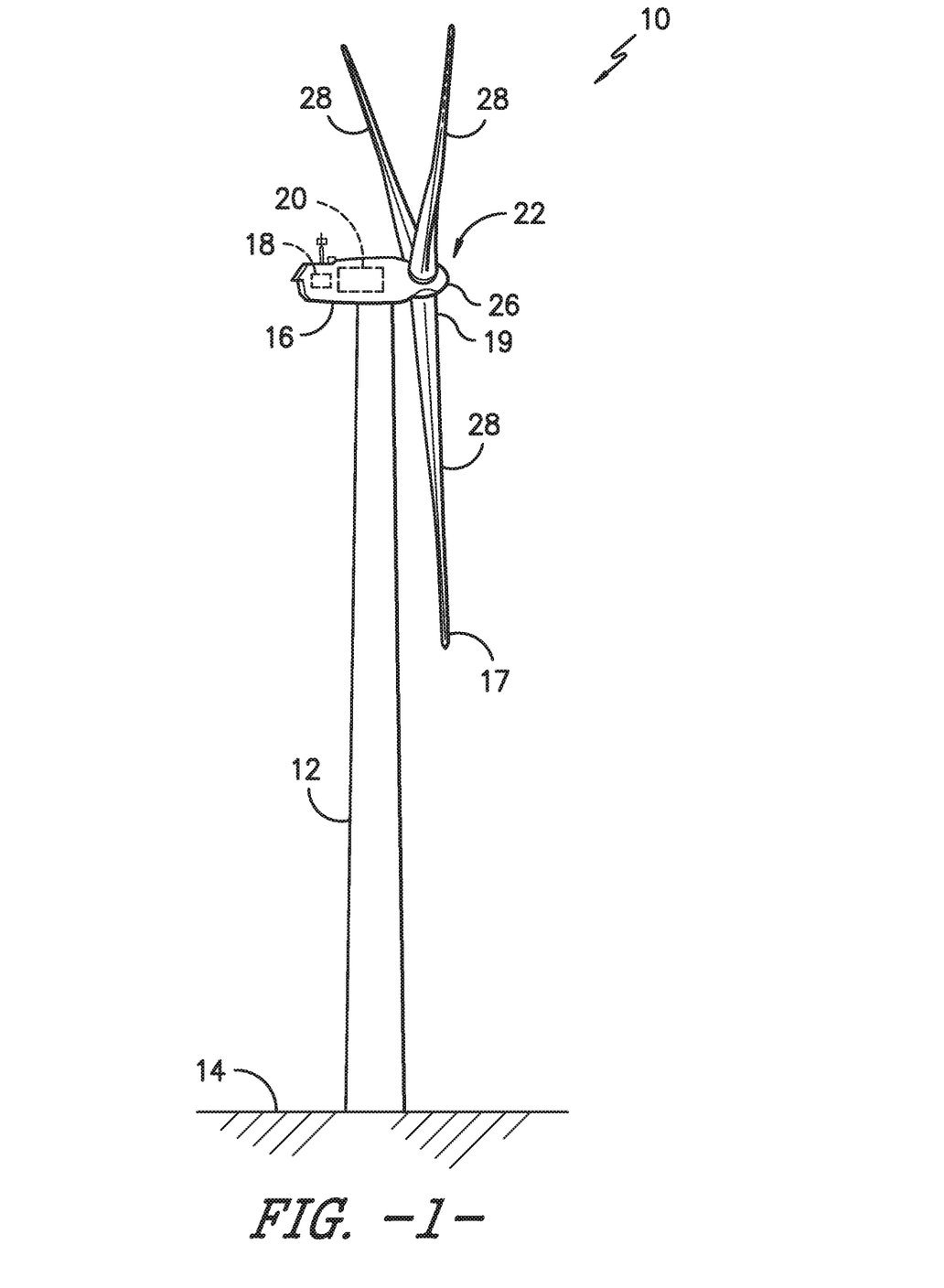
FIG. 1 illustrates a perspective view of one embodiment of a wind turbine according to the present disclosure.

Referring now to the drawings, FIG. 1 illustrates a perspective side view of one embodiment of a wind turbine 10 according to the present disclosure. As shown, the wind turbine 10 is a horizontal-axis wind turbine. Alternatively, the wind turbine 10 may be a vertical-axis wind turbine. Further, as shown, the wind turbine 10 includes a tower 12 that extends from a support surface 14, a nacelle 16 mounted on the tower 12, a generator 18 positioned within the nacelle 16, a gearbox 20 coupled to the generator 18, and a rotor 22 that is rotationally coupled to the gearbox 20 with a rotor shaft 24. The rotor 22 includes a rotatable hub 26 and at least one rotor blade 28 coupled to and extending outward from the rotatable hub 26. As shown, the rotor blade 28 includes a blade tip 17 to a blade root 19.

Figure 2:
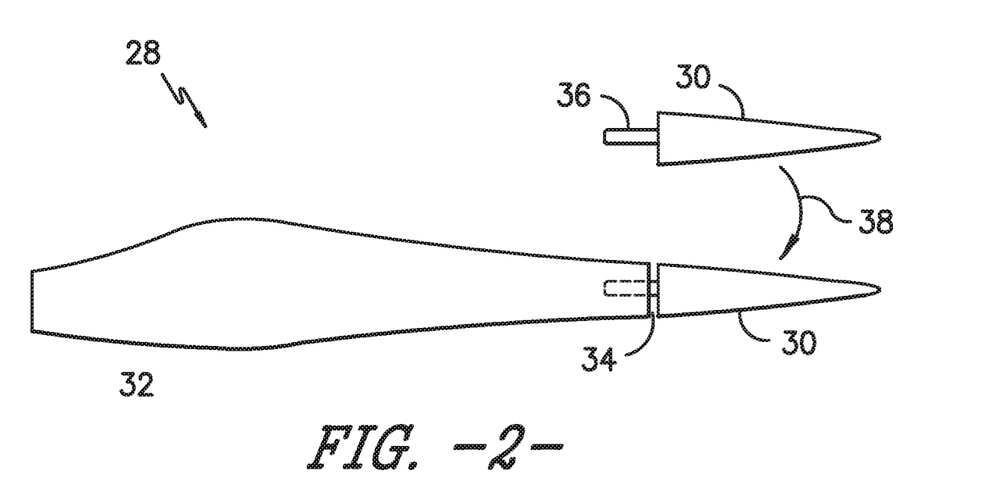
FIG. 2 illustrates a plan view of one embodiment of a rotor blade having a blade root segment and a blade tip segment according to the present disclosure.

Referring now to FIG. 2, a plan view of a rotor blade 28 having a first blade segment 30 and a second blade segment 32 according to the present disclosure is illustrated. More specifically, as shown, the first blade segment 30 corresponds to a blade tip segment and the second blade segment 32 corresponds to a blade root segment 32. Further, as shown, the blade tip segment 30 includes the blade tip 17 of the rotor blade 28, whereas the blade root segment 32 includes the blade root 19 of the rotor blade 28. In addition, as shown, the first blade segment 30 and the second blade segment 32 extends in opposite directions from a chord-wise joint 34. Further, each of the blade segments 30, 32 includes a pressure side shell member and a suction side shell member. Moreover, the first blade segment 30 and the second blade segment 32 are connected by at least one internal support structure 36 extending into both blade segments 30, 32 to facilitate joining of the blade segments 30, 32. The arrow 38 shows that the segmented rotor blade 28 in the illustrated example includes two blade segments 30, 32 and that these blade segments 30, 32 are joined by inserting the internal support structure 36 into the second blade segment 32.

Figure 3:
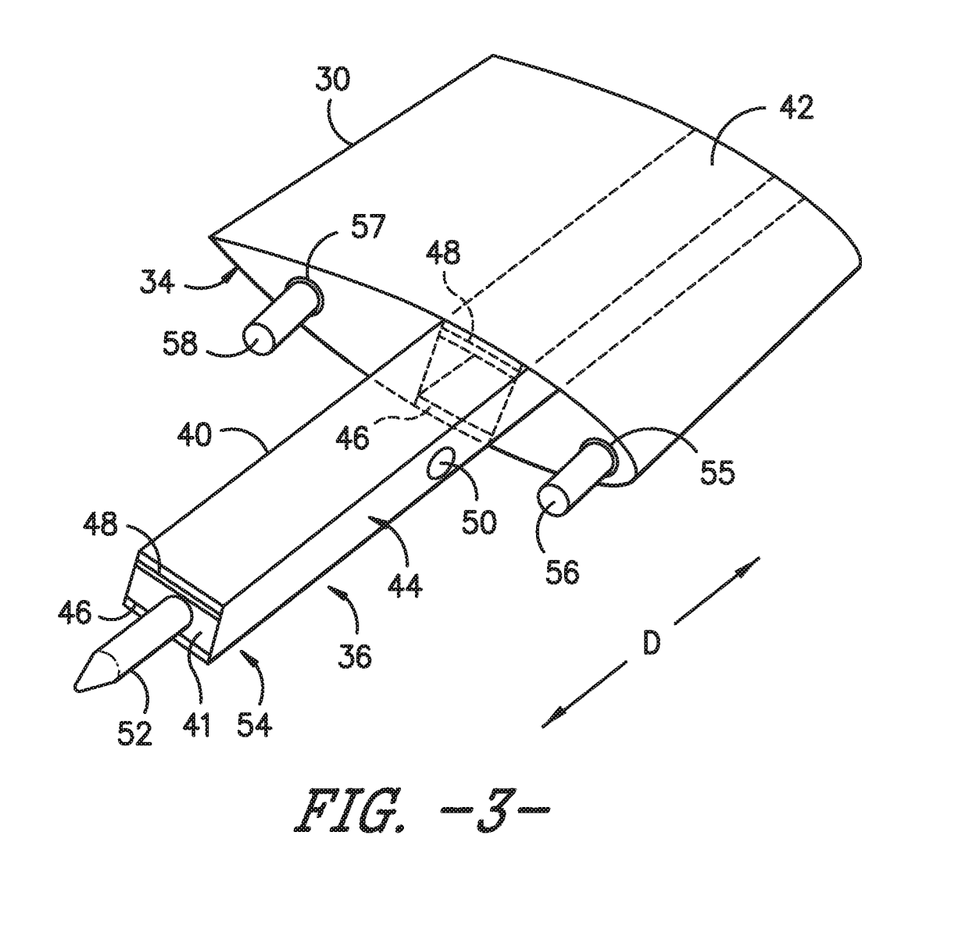
FIG. 3 illustrates a perspective view of one embodiment of a section of the blade tip segment according to the present disclosure.

Referring now to FIG. 3, a perspective view of a section of the first blade segment 30 according to the present disclosure is illustrated. As shown, the first blade segment 30 includes a beam structure 40 that forms a portion of the internal support structure 36 and extends lengthways for structurally connecting with the second blade segment 32. Further, the beam structure 40 forms a part of the first blade segment 30 having an extension protruding from a spar section 42, thereby forming an extending spar section. The beam structure 40 also includes a shear web 44 or spar beam structure connected with a suction side spar cap 46 and a pressure side spar cap 48.

Further, the first blade segment 30 includes one or more first bolt joints towards a first end 54 of the beam structure 40. In a non-limiting example, the first bolt joint(s) may include a pin that is in a tight interference fit with a bush. For example, as shown, the first bolt joints may include at least one bolt tube 52 located on the beam structure 40. Further, as shown, the bolt tube 52 is oriented in a span-wise direction. The first blade segment 30 may also include at least one bolt joint slot 50 located on the beam structure 40 proximate to the chord-wise joint 34. Further, as shown, the bolt joint slot 50 is oriented in a chord-wise direction. In one example, there may be a bushing within the bolt joint slot 50 arranged in a tight interference fit with a bolt tube or pin (shown as pin 53 in FIG. 6).

Further, the first blade segment 30 may include multiple second bolt joint tubes 56, 58 located at the chord-wise joint 34. More specifically, as shown, the multiple second bolt joint tubes 56, 58 include a leading edge bolt joint tube 56 and a trailing edge bolt joint tube 58. Each of the leading edge bolt joint tube 56 and the trailing edge bolt joint tube 58 may be oriented in a span-wise direction. In addition, as shown in the illustrated embodiment, each of the multiple second bolt joint tubes 56, 58 may include multiple flanges 55, 57 configured to distribute compression loads at the chord-wise joint 34.

It is to be noted that the bolt tube 52 located at the first end of beam structure 40 is separated span-wise from the multiple second bolt joint tubes 56, 58 located at the chord-wise joint 34 by an optimal distance D. This optimal distance D may be such that the chord-wise joint 34 is able to withstand substantial bending moments caused by shear loads acting on the chord-wise joint 34. In one non-limiting example, each of the bolt joints connecting the first and second blade segments 30, 32 may include an interference-fit steel bushed joint.

Figure 4:
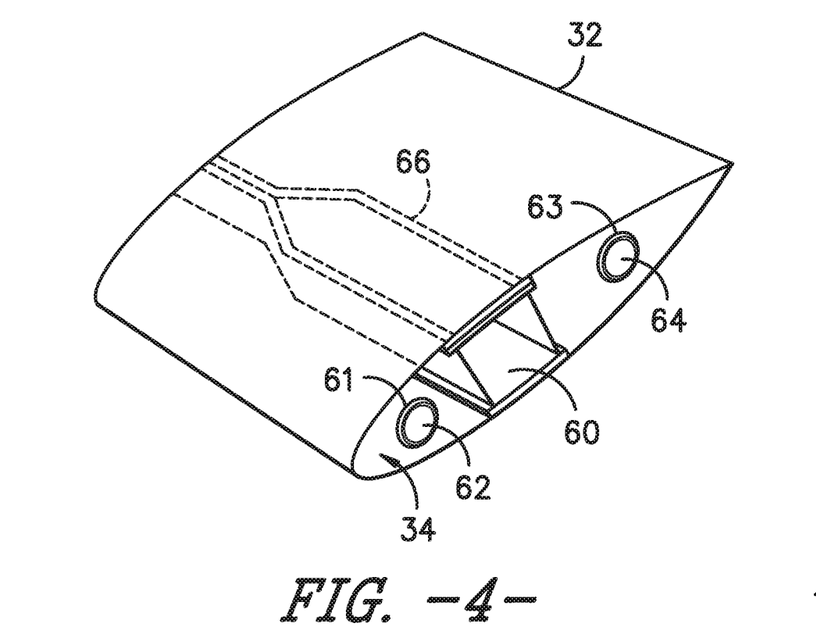
FIG. 4 illustrates a perspective view of one embodiment of a section of the blade root segment at the chord-wise joint according to the present disclosure.

Referring now to FIG. 4, a perspective view of a section of the second blade segment 32 at the chord-wise joint 34 according to the present disclosure is illustrated. As shown, the second blade segment 32 shows a receiving section 60 extending lengthways within the second blade segment 32 for receiving the beam structure 40 of the first blade segment 30. Further, as shown, the receiving section 60 includes multiple spar structures 66 that extend lengthways for connecting with the beam structure 40 of the first blade segment 30. Moreover, as shown, the second blade segment 32 further includes bolt joint slots 62, 64 for receiving bolt tubes 56, 58 (shown in FIG. 3) of the first blade segment 30 and forming tight interference fittings. In one example, as shown, each of the multiple bolt joint slots 62, 64 may include multiple flanges 61, 63 respectively that are configured to distribute compression loads at the chord-wise joint 34.

Figure 5:
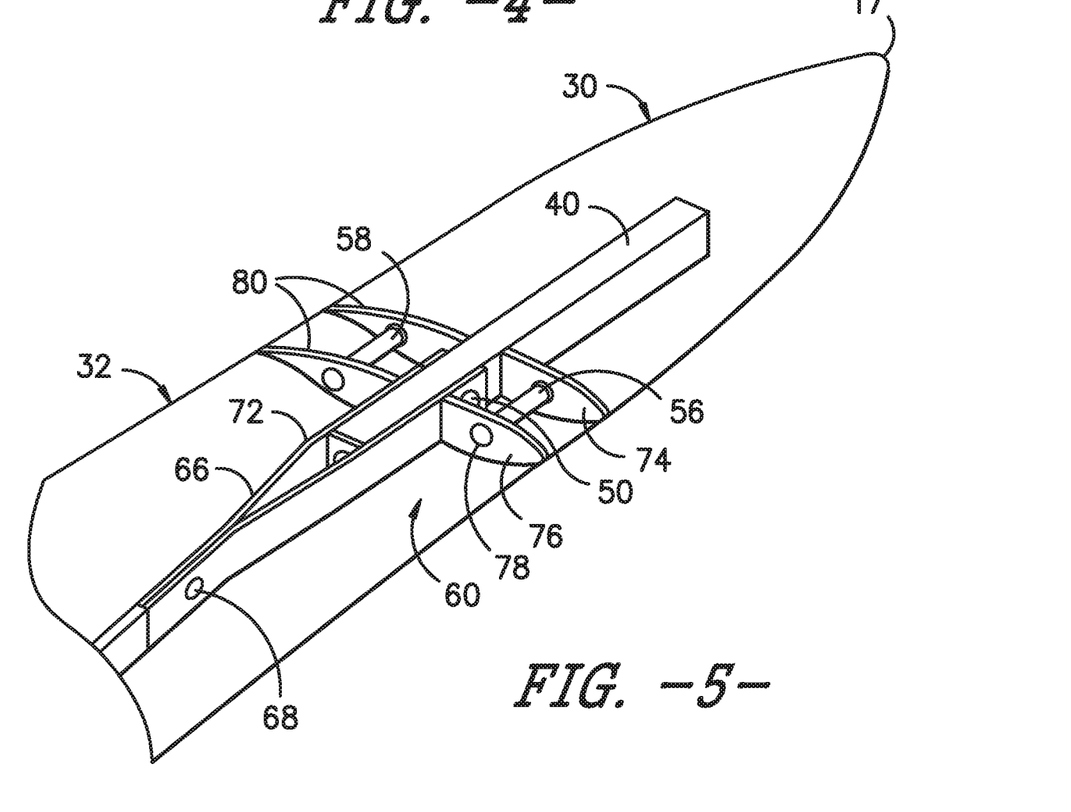
FIG. 5 illustrates an assembly of one embodiment of the rotor blade having the blade tip segment joined with the blade root segment according to the present disclosure.

Referring now to FIG. 5, an assembly 70 of the wind blade 28 having the first blade segment 30 joined with the second blade segment 32 according to the present disclosure is illustrated. As shown, the assembly 70 includes multiple supporting structures beneath outer shell members of the rotor blade 28 having the first blade segment 30 joined with the second blade segment 32. Further, as shown, the receiving section 60 includes the multiple spar structures 66 that support the beam structure 40. Moreover, the receiving section 60 also includes a rectangular fastening element 72 that connects with the bolt tube 52 of the beam structure 40 in the span-wise direction. Further, both the first and the second blade segment 30, 32 includes chord-wise members 74, 76 respectively at the chord-wise joint 34. The chord-wise members 74, 76 includes leading edge bolt openings 78 and trailing edge bolt openings 80 that allows bolt joint connections between the first and second blade segments 30, 32. Thus, as shown, the chord-wise members 74, 76 are connected by bolt tubes 56 and 58 that are in tight interference fit with bushings located in the leading edge bolt openings 78 and trailing edge bolt openings 80. In a non-limiting example, each of the spar structures 66, the rectangular fastening element 72, and the chord-wise members 74, 76 may be constructed of glass reinforced fibers.

Figure 6:
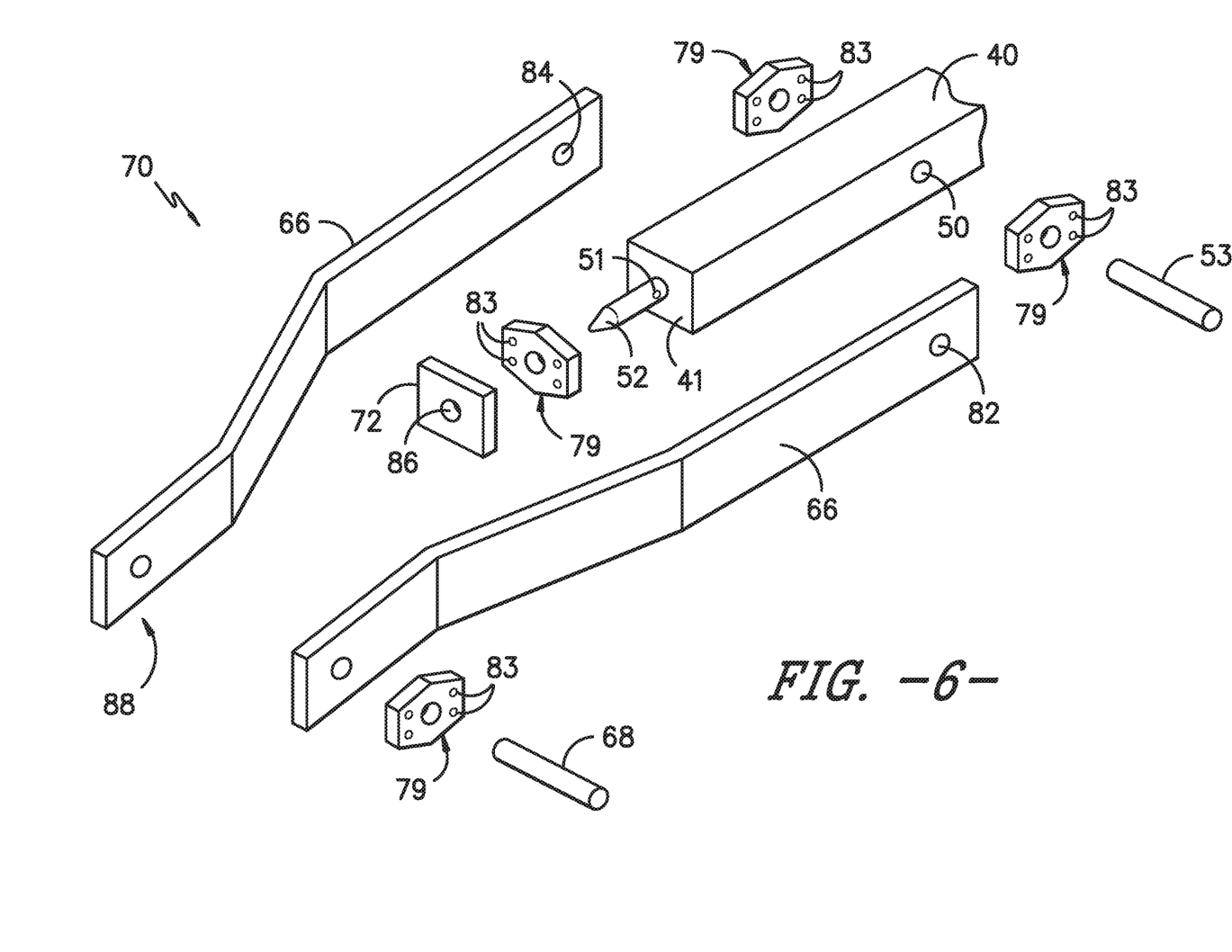
FIG. 6 illustrates an exploded perspective view of one embodiment of the multiple supporting structures of the rotor blade assembly according to the present disclosure.

Referring now to FIG. 6, an exploded perspective view of the multiple supporting structures of the assembly 70 towards the receiving section 60 of the rotor blade 28 according to the present disclosure is illustrated. As shown, a pair of spar structures 66 is configured to receive the beam structure 40 and includes bolt joint slots 82, 84 that are aligned with the bolt joint slot 50 of the beam structure 40 through which a bolt tube or pin 53 is inserted and remains in a tight interference fit such that spar structures 66 and the beam structure 40 are joined together by during assembling. In addition, as shown, the fastening element 72 includes a bolt joint slot 86 configured for receiving the bolt tube 52 of the beam structure 40 forming a tight interference fit bolted joint. Further, the pair of spar structures 66 is joined together at one end 88 using any suitable means, such as an adhesive material or an elastomeric seal. For example, as shown in FIGS. 5 and 6, the spar structures 66 are joined together via chord-wise pin 68.

In another embodiment, a sensor element 51 may also be disposed in or on any of the pin or bolt tubes described herein. For example, as shown in FIG. 6, the sensor element is shown on bolt tube 52. As such, the sensor element 51 is configured to assist in receiving and/or sending signals to a control unit (not shown) of the wind turbine 10 (as shown in FIG. 1) representative of multiple parameters such as blade loads and/or stresses.

Figure 7:
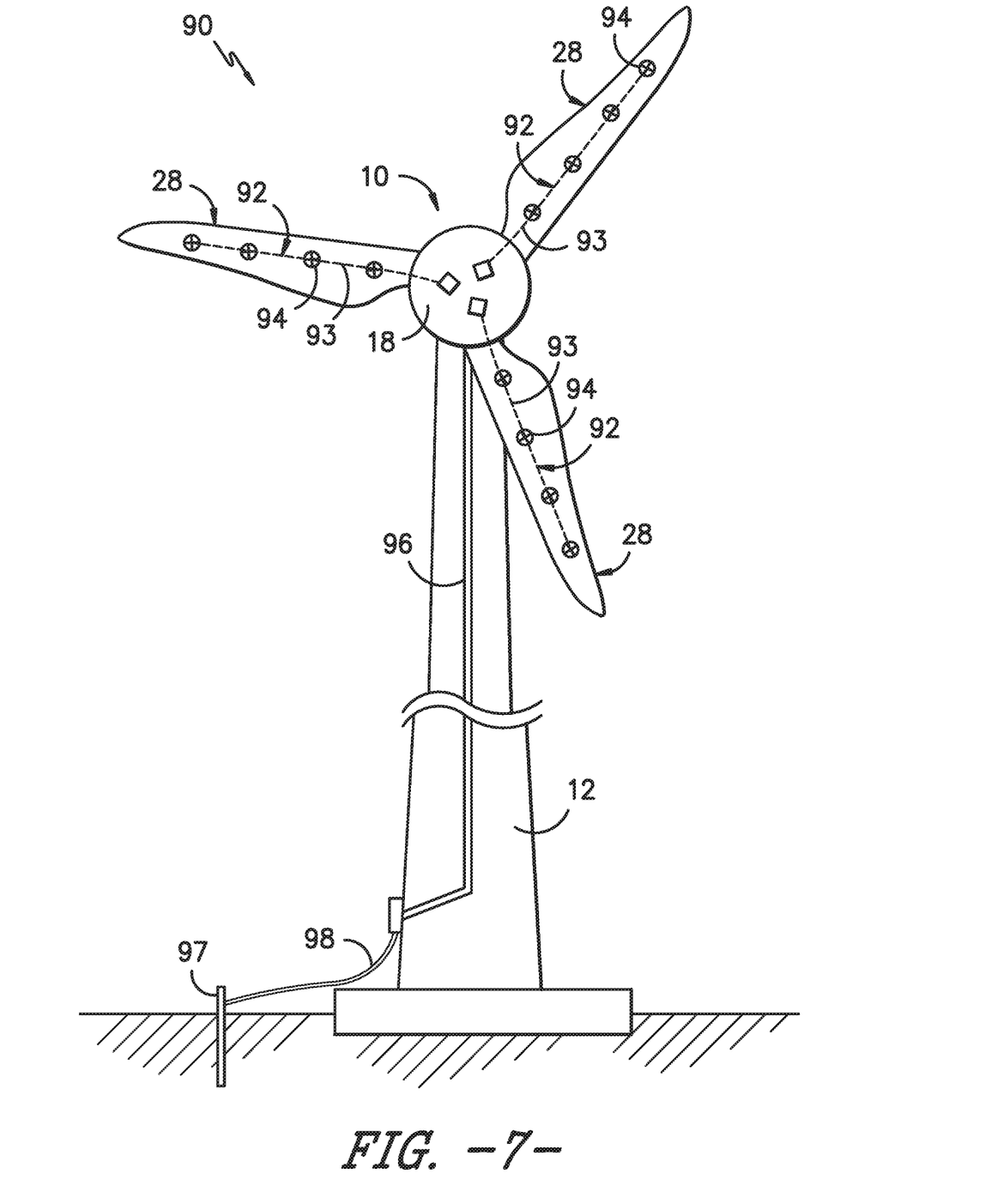
FIG. 7 illustrates a perspective view of another embodiment of a wind turbine, particularly illustrating a lighting protection system configured thereon according to the present disclosure.

Referring now to FIG. 7, a perspective view of another embodiment of the wind turbine 10 having a lightning protection system 90 configured therewith is illustrated. As shown, the lightning protection system 90 includes a plurality of lightning receptors 94 configured along either or both of the pressure or suction sides of the rotor blade 28. Further, as shown, each rotor blade 28 includes a conductive circuit 92 having a plurality of lightning receptors 94 connected via one or more lightning receptor cables 93 within the internal cavity of the rotor blade 28. The respective lightning conductive circuits 92 for each of the rotor blades 28 include terminal ends that extend through the root portion of the rotor blades 28 and are individually connected to a grounding system within the hub 26. The grounding system may be variously configured, as is well known in the art. For example, the grounding system may include any conductive path defined by the wind turbine's machinery or support structure, including blade bearings, machinery bed plates, tower structure, and the like, that defines any suitable ground conductive path 96 from the blades 28, through the tower 12, to a ground rod 97 via a ground cable 98, or other suitable electrical ground path.

More specifically, as shown in FIGS. 8-11, the lightning receptor cable 93 is routed from the blade tip 17 to each of the plurality of first bolt joints and to the blade root 19. For example, as shown, the first bolt joints may include, at least, a span-wise bushing connection (e.g. bolt tube 52) extending from an end face 41 of the beam structure 40 and a first chord-wise bushing connection (e.g. bolt joint pin 53) extending through the beam structure 40. As such, the span-wise bushing connection 52 fits within the receiving section 60 of the blade root segment 32 and the first chord-wise bushing connection 53 fits within corresponding slots 82, 84 of the receiving section 60 that align with a chord-wise slot 50 of the beam structure 40 (FIG. 6). In additional embodiments, as shown in FIGS. 5 and 6, the first bolt joints may also include at least one second chord-wise bushing connection (e.g. chord-wise pin 68) configured to connect the spar structures 66 at an end 88 thereof.

Figure 8:
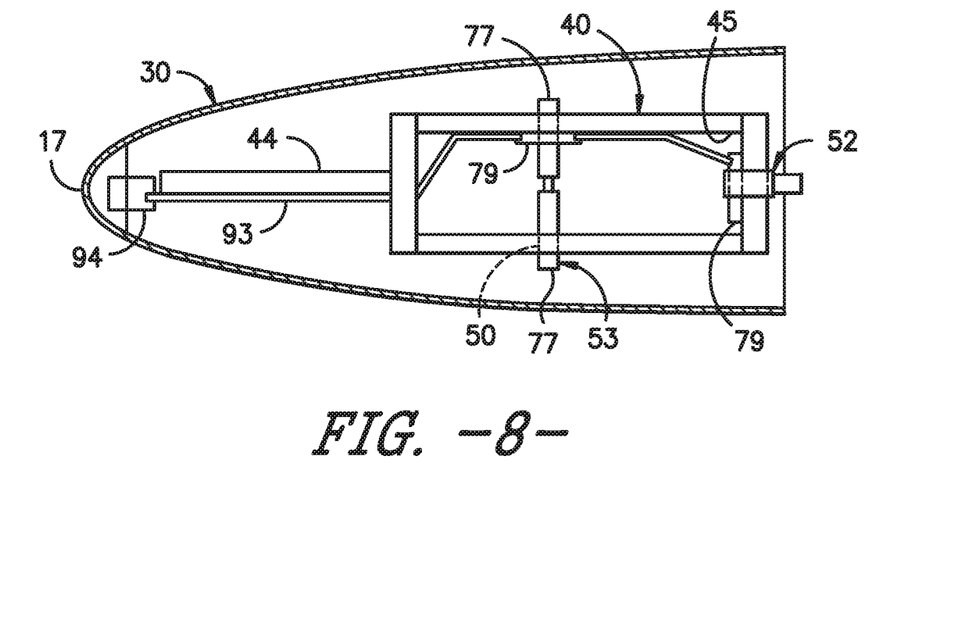
FIG. 8 illustrates a schematic view of one embodiment of the blade tip segment of the rotor blade according to the present disclosure, particularly illustrating the lightning receptor cable routed from the blade tip through the beam structure to a plurality of first blade joints.
Figure 11:
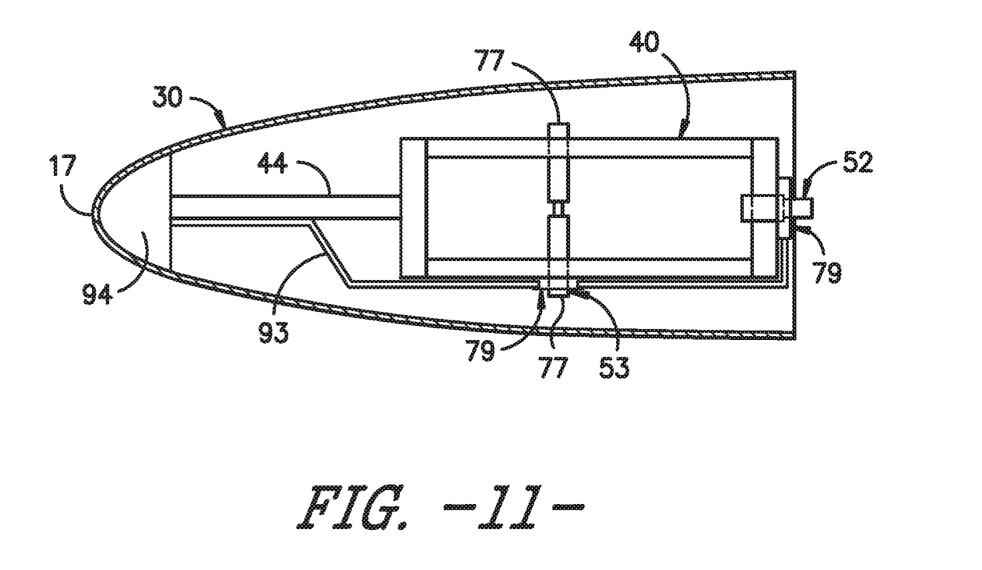
FIG. 11 illustrates a schematic view of another embodiment of the blade tip segment of the rotor blade according to the present disclosure, particularly illustrating the lightning receptor cable routed from the blade tip around the beam structure to a plurality of first blade joints.

Referring particularly to FIGS. 8 and 11, in one embodiment, the first chord-wise bushing connection 53 and/or the second chord-wise bushing connection 68 may extend beyond the beam structure 40 (e.g. in a chord-wise direction) so as to form one or more attachment locations 77 for the lightning receptor cable 93. As such, one or more metal bracket members 79 may be secured to the attachment locations 77 of one or more of the first bolt joints such that the lightning receptor cable 93 can be secured to each of the bracket members 79. More specifically, as shown in FIG. 6, each of the bracket members 79 may include one or more threaded holes 83 configured to receive the lightning receptor cable therethrough 93.

Figure 12:
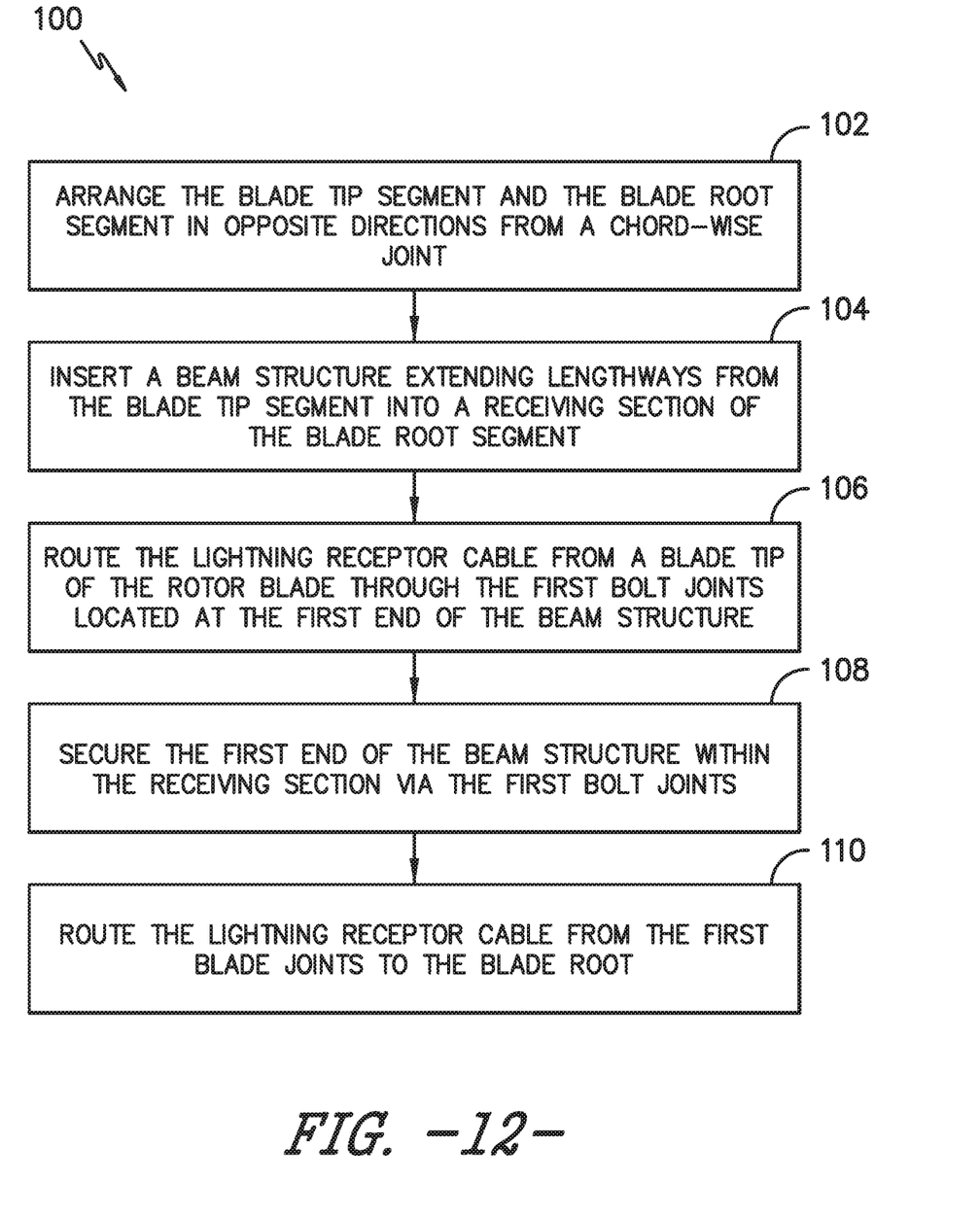
FIG. 12 illustrates a flow diagram of one embodiment of a method of assembling a rotor blade of a wind turbine according to the present disclosure.

Referring now to FIG. 12, a flow diagram of one embodiment of a method 100 of assembling one of the rotor blades 28 of the wind turbine 10 is illustrated. As shown at 102, the method 100 includes arranging the blade tip segment 30 and the blade root segment 32 in opposite directions from a chord-wise joint 34. As shown at 104, the method 100 includes inserting the beam structure 40 extending lengthways from the blade tip segment 30 into the receiving section 60 of the blade root segment 32. As shown at 106, the method 100 includes routing the lightning receptor cable 93 from the blade tip 17 through the first bolt joints located at the first end 54 of the beam structure 40. More specifically, as shown in FIG. 8, the lightning receptor cable 93 may be secured to the internal support structure 36, such as the shear web 44 and/or the spar caps 46, 48 of the rotor blade 28 and taken through the beam structure 40. In such an embodiment, the beam structure 40 can be pre-drilled with access holes to allow the lightning receptor cable 93 therethrough. As shown at 108, the method 100 includes securing the first end 54 of the beam structure 40 within the receiving section 60 via the first bolt joints.

Figure 9:
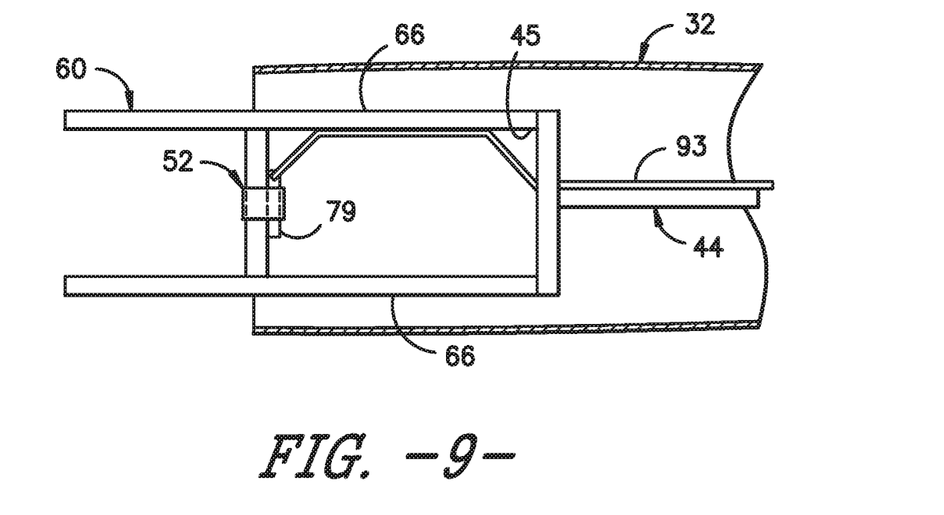
FIG. 9 illustrates a schematic view of one embodiment of the blade root segment of the rotor blade according to the present disclosure, particularly illustrating the lightning receptor cable routed from a first blade joint within the receiving section.
Figure 10:
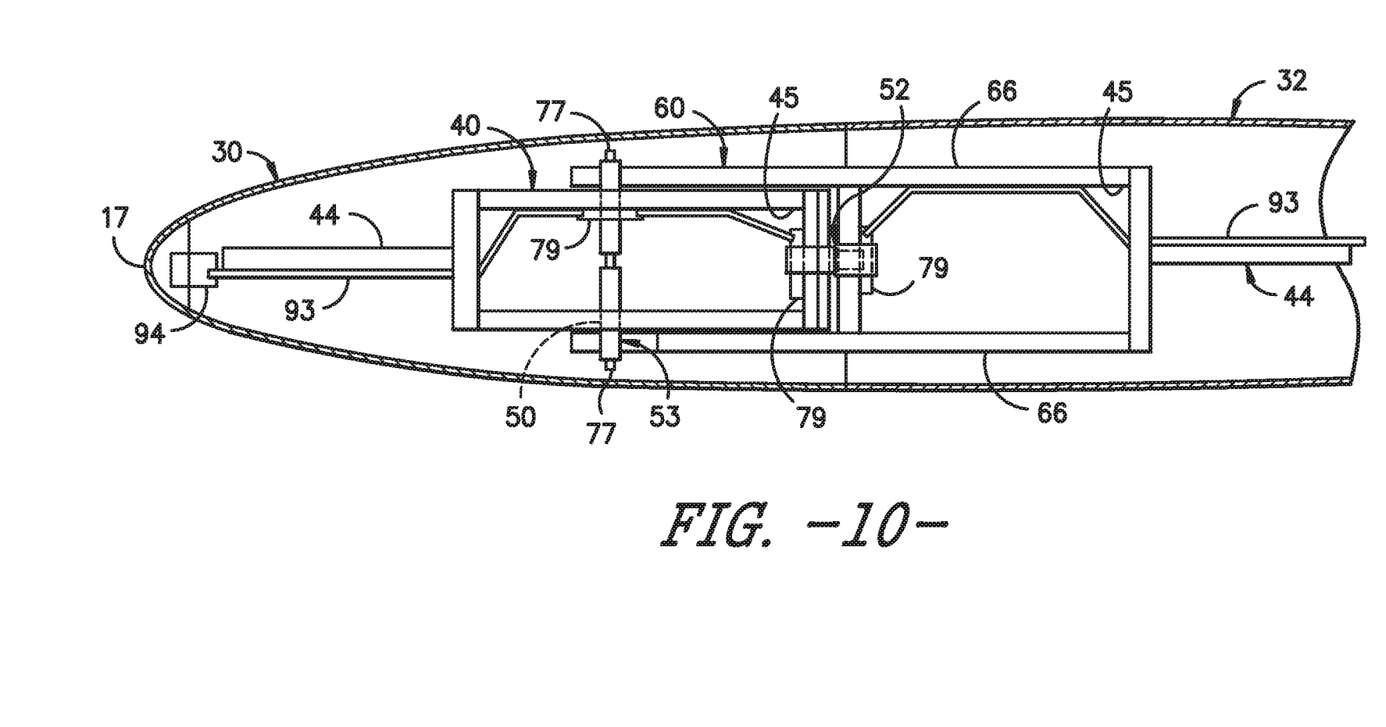
FIG. 10 illustrates a schematic view of an assembly of one embodiment of the rotor blade having the blade tip segment joined with the blade root segment according to the present disclosure, particularly illustrating the lightning receptor cable routed therethrough and contacting a plurality of first blade joints.

As shown at 110, the method 100 includes routing the lightning receptor cable 93 from the first blade joints to the blade root 19. For example, as shown in FIG. 8, the lightning receptor cable 93 is routed through the beam structure 40 and connected to one of the bracket members 79 configured with the chord-wise pin 53. Another branch of the lightning receptor cable 93 is then routed to the span-wise pin 52. From the span-wise pin 52, the lightning receptor cable 93 is then routed through the receiving section 60 of the blade root segment 32 to the blade root 19. In such an embodiment, as shown in FIGS. 8-10, the method 100 includes routing the lightning receptor cable 93 along an inner surface 45 of the beam structure 40 and/or the spar structures 66 of the receiving section 60. Alternatively, as shown in FIG. 11, the method 100 may include routing the lightning receptor cable 93 along an outer surface 47 of the beam structure 40 and/or the spar structures 66 of the receiving section 60.

In another embodiment, the method 100 may include securing the spar structures 66 together at the end 88 thereof via the second chord-wise bushing connection 68 and securing the lightning receptor cable 93 to the second chord-wise bushing connection 68. More specifically, as mentioned, the second chord-wise bushing connection 68 may extend beyond the connected spar structures 66 so as to form one or more attachment locations 77 for the lightning receptor cable 93. As such, the method 100 may also include securing one or more of the bracket members 79 described herein to one of the attachment locations 77 of each of the plurality of first bolt joints and securing the lightning receptor cable 93 to each of the bracket members 79. For example, in particular embodiments, the step of securing the lightning receptor cable 93 to each of the bracket members 79 may include routing the lightning receptor cable 93 through one of the threaded holes 83 of one of the bracket members 79.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A rotor blade assembly for a wind turbine, comprising:
a rotor blade comprising a blade tip segment and a blade root segment, the blade tip segment comprising a blade tip of the rotor blade, the blade root segment comprising a blade root of the rotor blade, the blade tip segment and the blade root segment extending in opposite directions from a chord-wise joint, each of the blade tip segment and the blade root segments having an internal support structure,
the blade tip segment comprising a beam structure extending lengthways that structurally connects with the blade root segment via a receiving section, wherein the beam structure forms a portion of the internal support structure and comprises a shear web connected with a suction side spar cap and a pressure side spar cap,
a plurality of first bolt joints located along the beam structure for connecting with the receiving section of the blade root segment, wherein the plurality of first bolt joints comprise at least a span-wise bushing connection extending from an end face of the beam structure and a first chord-wise bushing connection extending through the beam structure, each of the bushing connections being a conductive material, wherein each of the bushing connections comprises at least one metal bracket member coupled thereto; and
a lightning protection system configured with the rotor blade, the lightning protection system comprising at least one lightning receptor positioned within the blade tip segment and at least one lightning receptor cable comprising a plurality of branches electrically coupled to form a conductive circuit, the at least one lightning receptor cable being coupled at least between the at least one lightning receptor and the at least one metal bracket member of the chord-wise bushing connection, at least one branch of the lightning receptor cable being coupled between the at least one metal bracket member of the chord-wise bushing connection and the at least one metal bracket member of the span-wise bushing connection, an additional branch of the lightning receptor cable being routed between the span-wise bushing connection and the blade root.

2. The rotor blade assembly of claim 1, wherein the span-wise bushing connection fits within the receiving section of the blade root segment and the first chord-wise bushing connection fits within corresponding slots of the receiving section that align with a chord-wise slot of the beam structure.

3. The rotor blade assembly of claim 2, wherein the first chord-wise bushing connection extends beyond the beam structure so as to form one or more attachment locations for the lightning receptor cable.

4. The rotor blade assembly of claim 2, wherein the receiving section of the blade root segment comprises a plurality of spar structures extending lengthways for connecting with the beam structure of the blade tip segment using one of the plurality of first bolt joints.

5. The rotor blade assembly of claim 4, wherein the plurality of first bolt joints further comprise at least one second chord-wise bushing connection.

6. The rotor blade assembly of claim 5, wherein the second chord-wise bushing connection extends beyond the connected spar structures so as to form one or more attachment locations for the lightning receptor cable.

7. The rotor blade assembly of claim 1, wherein each of the at least one metal bracket member comprise one or more threaded holes configured to receive the lightning receptor cable.

8. The rotor blade assembly of claim 1, further comprising a plurality of second bolt joints located at the chord-wise joint, wherein the plurality of first bolt joints located at the first end of beam structure are separated span-wise with the plurality of second bolt joints located at the chord-wise joint.

* * * * *